United States Patent
Drucker et al.

(10) Patent No.: US 6,205,802 B1
(45) Date of Patent: Mar. 27, 2001

(54) TRAVEL COACH AIR CONDITIONING SYSTEM

(75) Inventors: Alan Steven Drucker; Belin George Czechowicz, both of Dewitt, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/477,992

(22) Filed: Jan. 5, 2000

(51) Int. Cl.⁷ ...................................................... B60H 1/32
(52) U.S. Cl. ................................................ 62/236; 62/244
(58) Field of Search ........................... 62/236, 239, 244, 62/323.3

(56) References Cited

U.S. PATENT DOCUMENTS

| | | | |
|---|---|---|---|
| 4,280,339 | * 7/1981 | Harris et al. | 62/236 |
| 4,888,959 | * 12/1989 | Brown | 62/244 |
| 5,001,905 | * 3/1991 | Miyazaki | 62/244 |
| 5,333,678 | * 8/1994 | Mellum et al. | 62/236 |
| 5,896,750 | * 4/1999 | Karl | 62/236 |
| 5,927,084 | 7/1999 | Fielding | 62/90 |

OTHER PUBLICATIONS

Technical Brochure, "Carrier Weathermaster III Heat Pump System" (38HQ) pp 1–11.
Operation and Service Manual, "Coach Air Conditioning and Heating System" (Model 68G5–101 for MCI Intercity Coach).

* cited by examiner

Primary Examiner—William E. Tapolcai
(74) Attorney, Agent, or Firm—Wall Marjama & Bilinski

(57) ABSTRACT

A travel coach having a passenger and a driver section separated from a cargo area by a floor. The cargo area is divided into bays serviced by large bay doors. An air conditioning system is mounted in the cargo area and includes two electrically driven compressors mounted in one bay and a condenser unit mounted in a neighboring bay. The condenser unit contains a first heat exchanger circuit for servicing a pair of evaporators units and a second heat exchanger circuit for servicing at least one other evaporator unit. The evaporator units are mounted in existing ductwork located beneath the floor of the coach and provide cooling to the passenger and driver sections of the coach. Refrigerant from the evaporators is returned to the compressors to complete the two refrigerant cycles.

7 Claims, 4 Drawing Sheets

TRAVEL COACH AIR CONDITIONING SYSTEM

FIELD OF THE INVENTION

This present invention relates generally to air conditioning, and particular to air conditioners.

BACKGROUND OF THE INVENTION

Large passenger coaches are presently being converted into travel homes for professional entertainers, athletes, and other personalities who must travel a great deal of the time. These coaches are delivered to the converter from the manufacturer in a stripped down condition with a heating system, including air ducts, but without an air conditioning system. It is therefore left up to the converter to install its own air conditioning.

It has been the general practice in the industry to purchase preexisting air conditioning systems and install them in the best way possible in a stripped down coach. This practice has proven, however, to be far from satisfactory for a number of reasons.

Typically, the preexisting systems purchased by the converter are either window units or split residential units. The average coach generally requires that three separate units be installed to properly cool the driver and passenger compartments of the coach. In the case of window units where all the component parts of the system are mounted upon a single frame, the units are generally mounted in the cargo area as close as possible to the existing air duct servicing a particular area. The three units are bulky, thus take up a good deal of valuable cargo space. The split systems, where the evaporator is separated from the other components of the system, provide for somewhat greater flexibility of installation. However, here again, three or more units are required to cool the driver and passenger compartments which, again, consumes valuable cargo space. The preexisting units installed in a coach oftentimes come from different manufacturers, thus making installation, servicing and maintaining the units difficult and expensive.

In an effort to solve some of the difficulties associated with air conditioning passenger coaches, the present assignee has recently introduced a dedicated air conditioning system that interfaces well with the existing electrical wiring of most coaches, as well as the existing heating ductwork provided by the manufacturers. The system includes a single condenser and compressor and three separate evaporators that are adapted to provide cooling to both the roadside and the curbside of the coach as well as the driver's compartment. The compressor is a reciprocating machine that is driven through a clutch directly from the engine of the coach. The condenser unit is located in one of the cargo bays in the mid-section of the coach, quite some distance from the compressor. The condenser, in turn, provides liquid refrigerant to the three separated evaporators situated throughout the coach.

The above noted dedicated system represents an improvement in the passenger coach industry and the present invention expands upon these improvements with relation to passenger coaches that are converted to travel homes which are herein referred to as conversion coaches.

SUMMARY OF THE INVENTION

It is therefore a primary object of the present invention to improve air conditioning systems used in passenger coaches that have been converted into travel homes.

It is a further object of the present invention to further compact air conditioning systems used in converted passenger coaches.

Another object of the present invention is to enhance the performance of an air conditioning system used in a passenger coach that has been converted into a travel home and reduce the cost of installing the cooling system.

These and other objects of the present invention are attained by a dedicated air conditioning system for use in a converted passenger coach. The system includes a pair of electrically driven compressors mounted in a cargo bay of the coach immediately adjacent one of the bay doors. An air cooled condenser unit having first and second refrigerant flow circuits is mounted in a neighboring bay adjacent a second bay door so that ambient air can be efficiently drawn into the condenser through vents in the second bay door for cooling the condenser and then exhausted through the bottom of the coach. Three individual evaporator units are connected into the existing heating ducts for providing cooling to the driver's compartment and to both the roadside and curbside regions of the passengers compartment. Suitable expansion devices are installed in the system for throttling refrigerant moving through refrigerant lines connecting the condenser unit and each of the evaporator units. The compressors are driven from an electrical generator connected to the coach engine when the coach engine is running and from either an independent on-board generator or outside source of electricity power when the coach is parked.

BRIEF DESCRIPTION OF THE DRAWING

For a better understanding of these and objects of the invention, reference will be made to the following detailed description of a preferred embodiment of the invention, read in connection with the accompanying drawings, in which.

DETAILED DESCRIPTION OF THE INVENTION

Figure 1:
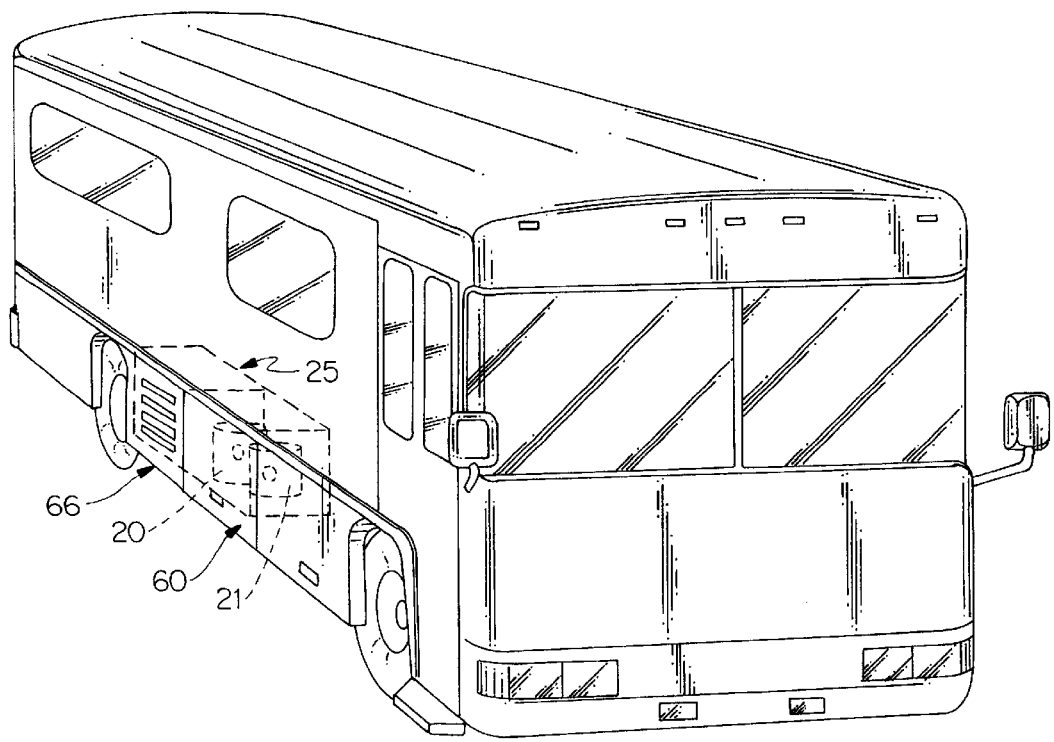
FIG. 1 is a perspective view of a typical passenger coach that has been converted into a travel home.

Turning now to FIG. 1, there is illustrated a large passenger coach, generally referenced 10, of the type widely known in the industry and available through a number of manufacturers for conversion into travel homes for people who are forced to travel over the road for extended periods of time. Although the coaches are available through a number of manufacturers, they all have the same general configuration and include an upper passenger compartment that is separated from a lower cargo area by a floor. The coaches are typically delivered from the manufacturer in a stripped down condition that includes ductwork through which conditioned (heated) air can be delivered to both the curbside region and the roadside region of the passenger's compartment as well as the driver's position. The lower cargo area is further divided into bays which are accessed through large bay doors located on both the curbside and roadside of the coach.

Figure 2:
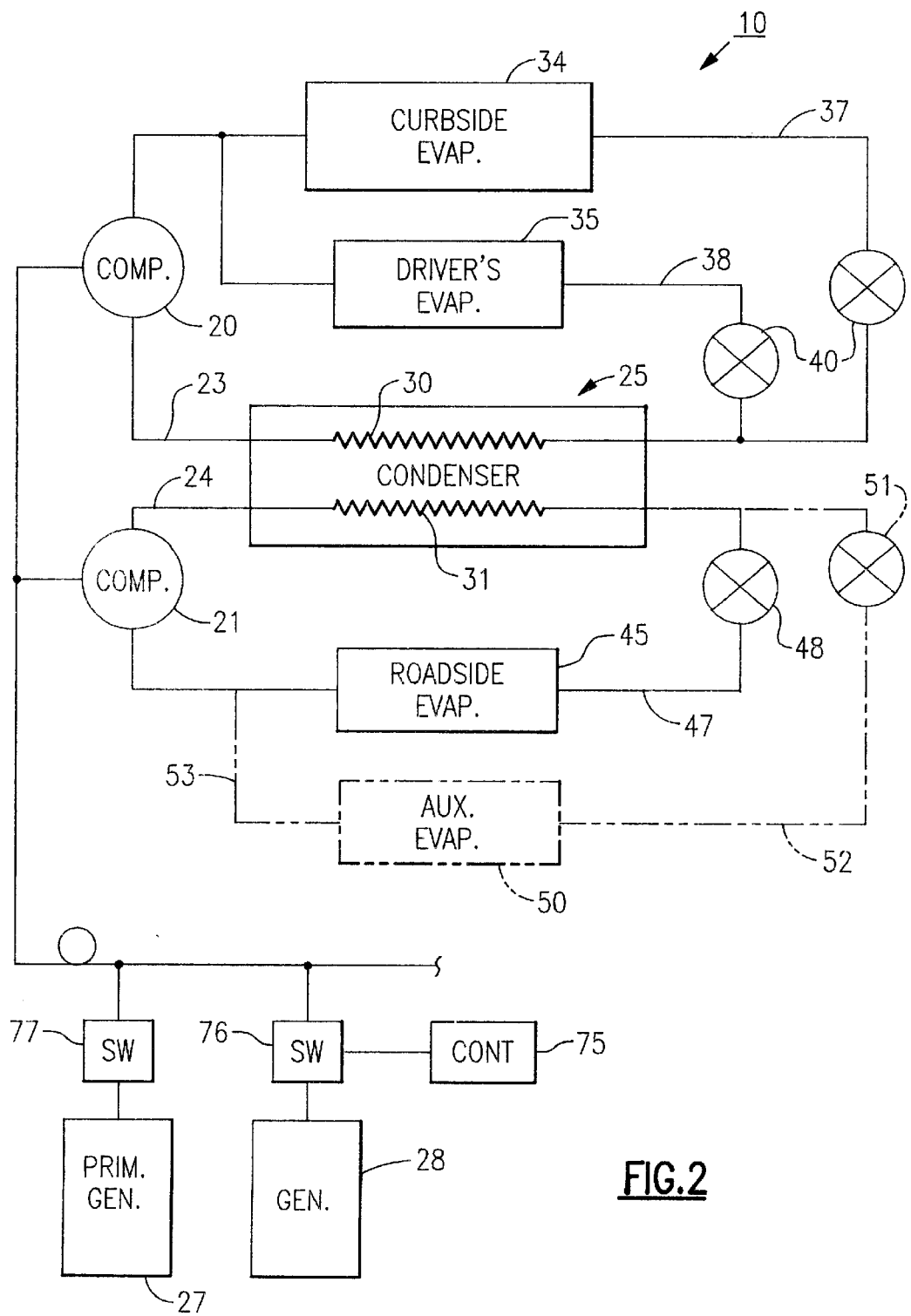
FIG. 2 is a schematic diagram illustrating a dedicated air conditioning system suitable for installation in a passenger coach that has been converted into a travel home.

As illustrated schematically in FIG. 2, the present air conditioning system 18 employs two individual electrically driven compressors 20 and 21 that are each capable of delivering high temperature, high pressure refrigerant through suitable supply lines 23 and 24 to a downstream condenser unit generally referenced 25. The compressors can be, for example, scroll type compressors or any other electrically driven compressor that is known or used in the art. The compressors are arranged so that they can be selectively driven from a primary generator 27 that is coupled to the coach engine or from a secondary generator 28. The primary generator is employed under normal operating conditions when the coach engine is running. The secondary generator is employed when the coach is parked and the engine is not running. A desired generator is operatively selected through means of a controller 75 that is located in the driver's compartment, which remotely operates switches 76 and 77 associated with the generators. The secondary generator is preferably located adjacent to a bay door so that it can be readily accessed for service and maintenance. The secondary generator is self-contained and has its own gasoline engine which consumes considerably less fuel than the coach engine, thus resulting in a considerable savings to the user. Alternatively, the compressor can be connected directly to an outside power supply, when available, thereby bypassing both generators. To this end, it is preferred that the compressors can operate on a conventional electrical outlet.

The discharge side of the first compressor 20 is connected to a first condenser heat exchanger circuit 30 by supply line 23 while the discharge side of the second compressor 21 is connected to a second condenser heat exchanger circuit 31 via supply line 24. The first condenser heat exchanger is arranged to supply refrigerant to a curbside evaporator 34 and a driver's compartment evaporator 35 via refrigerant lines 37 and 38, respectively. Suitable expansion devices 40 are mounted in the refrigerant lines to throttle the refrigerant in the lines to a lower temperature prior to delivery to the evaporators. The two evaporators, in turn, are coupled to the inlet side of compressor 20 by return lines 42 and 43.

The discharge side of compressor 21 is similarly connected to the second condenser heat exchanger circuit 31 by a supply line 24 and the outlet of the second condenser circuit is connected to the roadside evaporator 45 by means of a refrigerant line 47. An expansion device 48 is mounted in the refrigerant line to throttle refrigerant entering the roadside evaporator. The outlet of the roadside evaporator is attached to the inlet of the second compressor 21 via return line 49 to complete the roadside loop. If necessary, an auxiliary evaporator 50, shown in phantom outline, may be added to the roadside loop for providing cooling to a separate area in the passenger's compartment. Here again, refrigerant from the second condenser circuit is throttled by an expansion device 51 mounted in refrigerant line 52 and returned to compressor 21 by return line 53.

Figure 3:
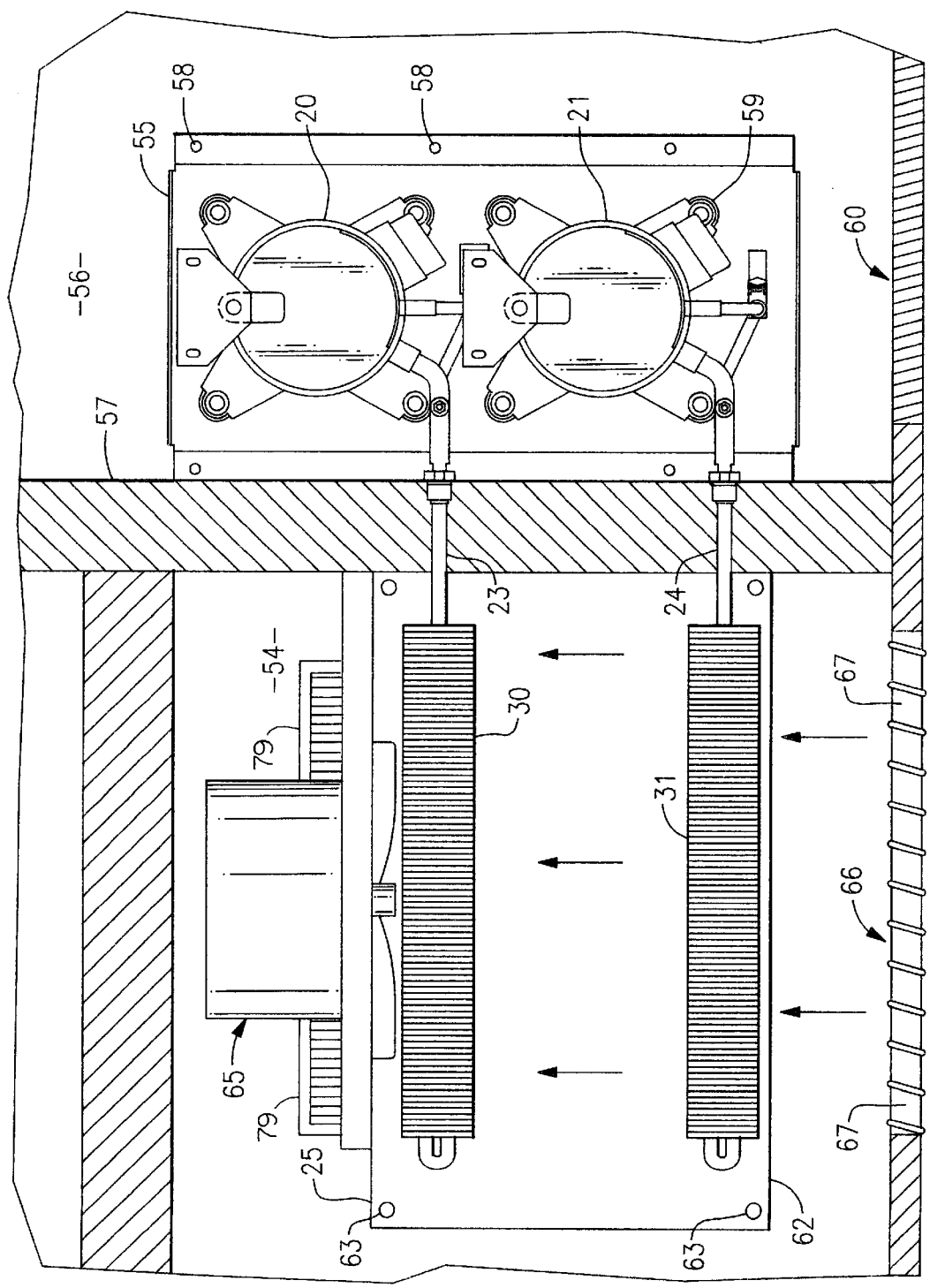
FIG. 3 is an enlarged partial top view in section showing the mounting alignment of the system compressors and the system condenser unit within adjacent cargo bays.

As illustrated in FIG. 3, the two compressors are mounted upon a rigid frame 55 in cargo bay 56 next to a partition 57 which separates bay 56 from a second cargo bay 54. The compressor frame is secured to the floor of the bay by lag bolts 58 so that the compressors are prevented from moving about as the coach moves over uneven roads or rough terrain. Each compressor is seated on the frame upon rubber mounts 59 which are designed to isolate the compressors from externally induced vibrations and shock loads. The compressor frame is located close to bay door 60 so that they can be readily accessed for service and maintenance.

The condenser unit 25 is housed in a separate bay 54, which, as noted above, is separated from bay 56 by a partition 57. Here again, the condenser frame 62 is secured to the floor of the bay by lag bolts 63. The supply lines 23 and 24 from the two compressors pass through the partition and the length of each line is consequently relatively short. Accordingly, the distance that the compressed refrigerant has to travel is lessened and correspondingly minimizes the amount of line needed to connect the condenser to the compressor. A fan unit 65 is mounted upon the condenser frame to provide cooling air to the unit. The condenser unit is also mounted close to a bay door 66 so that the equipment can be readily accessed. The bay door contains louver opening 67 through which ambient air for cooling the air from the condenser unit is drawn into the bay. The cooling air is exhausted through discharge vents 79 in the floor of the bay. Preferably, the condenser bay 54 is entirely enclosed within the bay to prevent excessive heating of the cargo area and lessen the noise level of the system.

Figure 4:
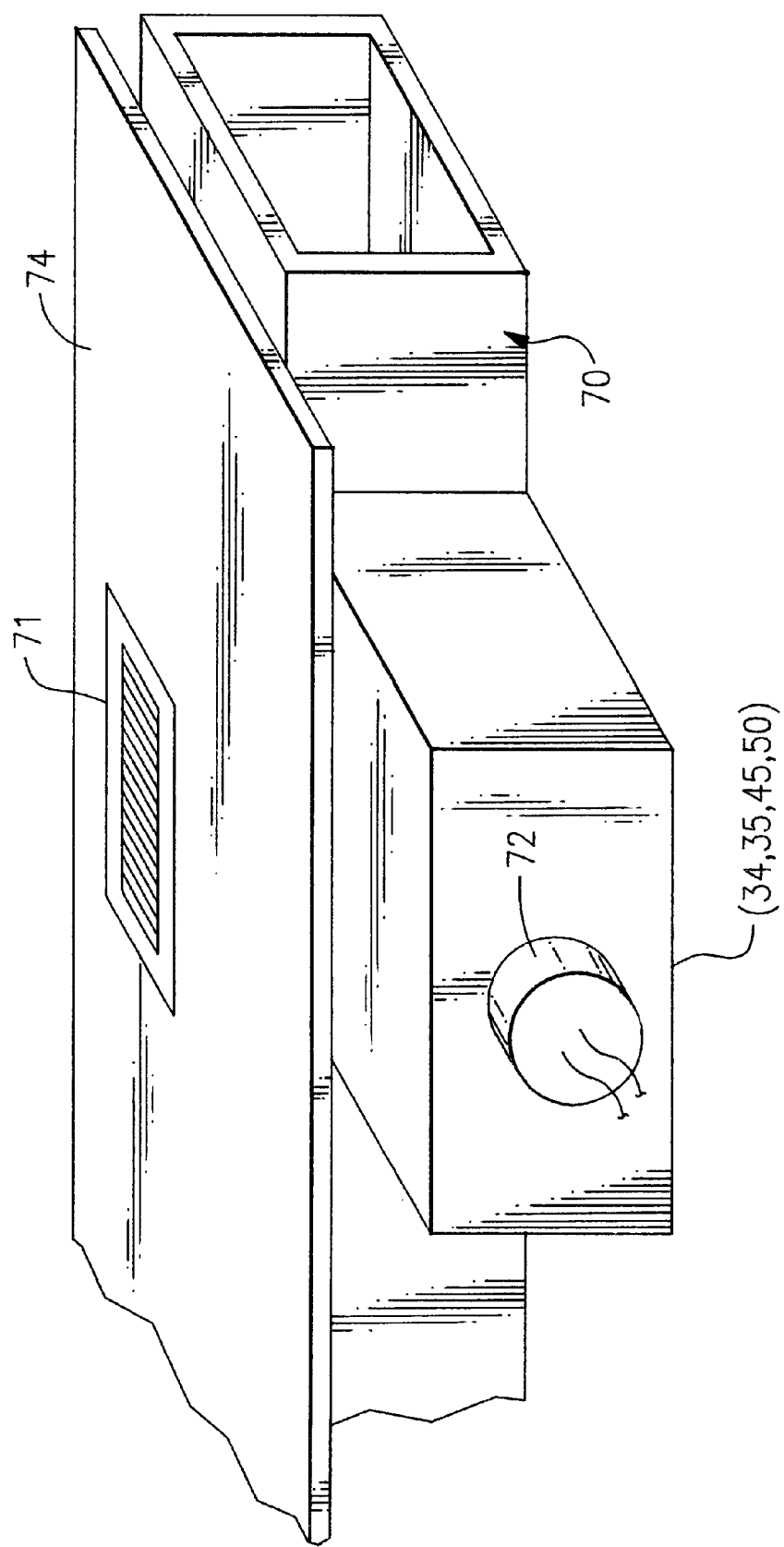
FIG. 4 is a further enlarged view showing how the system evaporators are connected into the existing coach ductwork.

Referring now to FIG. 4, each evaporator unit is preferably connected directly into the coach's existing ductwork 70 as close as possible to the conditioned air vents 71 servicing each of the zones being cooled. As noted above, the ductwork, including the conditioned air vents, are provided by the coach manufacturer and it is a reasonably simple task to adapt the evaporator units to the existing ductwork. Each evaporator unit is provided with its own fan unit 72 which circulates conditioned air through the comfort zone. The ducts are typically located immediately below the floor 74 of the coach and are easily accessed making installation of the evaporator units a relatively simple task.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A travel coach that includes:
    a passenger compartment and a driver's compartment that is separated from a cargo area by a floor,
    a series of bays in said cargo area equipped with bay doors;
    first and second electrically driven refrigerant compressors mounted in a first compressor bay adjacent to a first bay door whereby said compressors are readily accessible when said first bay door is opened;
    an air cooled condenser unit mounted in a second condenser bay adjacent to a second bay door, whereby said condenser unit is readily accessible when the second bay door is opened;
    said condenser unit including a first heat exchanger circuit connected to the discharge side of said first compressor and a second heat exchanger circuit connected to the discharge side of said second compressor,
    said first condenser heat exchanger being connected to a first evaporator unit for cooling a zone in the passenger's compartment and to a second evaporator unit for providing cooling the driver's compartment;
    said second heat exchanger circuit being connected to at least a third evaporator unit for providing cooling air to another zone in said passenger's compartment,
    expansion means for throttling refrigerant moving from said condenser unit into each of said evaporator units; and
    return lines for connecting said first and second evaporator means to said first compressor and said third evaporator to said second compressor.

2. The travel coach of claim 1 wherein said condenser unit contains a fan for passing cooling air over both heat exchanger circuits.

3. The travel coach of claim 2 wherein said second bay door contains louver openings through which ambient air is drawn for cooling the condenser unit.

4. The travel coach of claim 1 wherein said compressor bay is separated from said condenser bay by a partition and said compressors are mounted upon a frame adjacent one side of the partition and said condenser unit is mounted adjacent the opposite side of said partition.

5. The travel coach of claim 1 that further includes a primary generator driven by the coach engine for providing power to said compressors when the engine is running and a secondary generator having an independent drive for providing power to the compressors when the coach engine is inoperative.

6. The travel coach of claim 1 that further includes ductwork beneath said floor for delivering cooling air to various zones within the passenger compartment and said evaporators are connected to said ductwork.

7. The travel coach of claim 6 that further includes a further auxiliary evaporator that is connected between said second condenser heat exchanger circuit and said second compressor.

\* \* \* \* \*